United States Patent
Overstreet et al.

(10) Patent No.: US 8,776,341 B2
(45) Date of Patent: Jul. 15, 2014

(54) METHOD OF REPAIRING DIAMOND ROCK BIT

(75) Inventors: James L. Overstreet, Tomball, TX (US); Kenneth E. Gilmore, Cleveland, TX (US); James C. Green, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 1306 days.

(21) Appl. No.: 12/123,264

(22) Filed: May 19, 2008

(65) Prior Publication Data

US 2008/0283305 A1 Nov. 20, 2008

Related U.S. Application Data (60) Provisional application No. 60/938,741, filed on May 18, 2007.

(51) Int. Cl.
*B22D 19/00* (2006.01)
(52) U.S. Cl.
USPC ........................................ 29/402.18; 175/425
(58) Field of Classification Search
USPC ................ 29/402.18; 76/108.2; 175/374–428
See application file for complete search history.

(56) References Cited

U.S. PATENT DOCUMENTS

| | | | | |
|---|---|---|---|---|
| 4,610,320 A | * | 9/1986 | Beakley | 175/425 |
| 5,163,524 A | | 11/1992 | Newton, Jr. et al. | |
| 5,492,186 A | * | 2/1996 | Overstreet et al. | 175/374 |
| 5,560,440 A | * | 10/1996 | Tibbitts | 175/384 |
| 6,568,491 B1 | * | 5/2003 | Matthews et al. | 175/374 |
| 6,651,756 B1 | * | 11/2003 | Costo et al. | 175/374 |
| 7,240,746 B2 | | 7/2007 | Overstreet et al. | |
| 2006/0102354 A1 | * | 5/2006 | Gammage et al. | 166/304 |
| 2008/0029310 A1 | * | 2/2008 | Stevens et al. | 175/374 |

FOREIGN PATENT DOCUMENTS

| | | |
|---|---|---|
| DE | 2749456 | 5/1979 |
| EP | 1182325 A1 | 2/2002 |
| WO | WO9823402 | 6/1998 |
| WO | WO 0216725 A1 * | 2/2002 |
| WO | WO0216725 A1 | 2/2002 |

OTHER PUBLICATIONS

International Search Report for International Application No. PCT/US2008/006394 mailed Apr. 3, 2009, 5 pages.
International Written Opinion for International Application No. PCT/US2008/006394 mailed Apr. 3, 2009, 7 pages.

\* cited by examiner

*Primary Examiner* — Jacob Cigna
(74) *Attorney, Agent, or Firm* — TraskBritt (57) ABSTRACT

Hardfacing is applied on gage surfaces of bit blades, the leading and trailing edges of bit blades, and on carbide inserts. The gage surfaces contains natural diamonds, synthetic diamonds, thermally stable polycrystalline (TSP) diamonds and carbide inserts, and the hardfacing is applied over at least a portion of them. As primary cutters on the bit blades are worn down during drilling, the gage surfaces of the bit blades are also worn down. A hardfacing is applied to the worn gage surfaces of the bit blades, thereby allowing the drill bit to drill deeper and longer without requiring replacement.

6 Claims, 8 Drawing Sheets

METHOD OF REPAIRING DIAMOND ROCK BIT

CROSS-REFERENCE TO RELATED APPLICATION

This application claims priority to U.S. Provisional Patent Application Ser. No. 60/938,741, filed May 18, 2007.

FIELD OF THE INVENTION

This invention relates in general to diamond earth-boring drill bits and, in particular, to a method of repairing a matrix body diamond bit.

BACKGROUND OF THE INVENTION

Rolling cone bits may have teeth machined from the steel bodies of the cones. Rolling cone bits may also have tungsten carbide inserts press-fit into mating holes in the cones. Hardfacing has been employed on the gage surfaces of both types of rolling cone bits, as well as on portions of steel bit bodies for many years to resist abrasive wear. Hardfacing is also applied to the machined teeth. However, hardfacing is not applied to tungsten carbide inserts.

The hardfacing typically comprises granules of tungsten carbide located within a steel alloy binder. One method of applying the hardfacing to rolling cone bits has been to use an oxy-acetylene torch to melt a hardfacing tube or rod onto the steel. The hardfacing rod is typically a steel tube containing a filler comprising tungsten carbide granules. The temperature to melt the tube and bond the hardfacing to the steel of the bit in a prior art method for rolling cone bits may be in excess of 1500° C.

Another type of bit, often called a diamond bit, has a cast metal-matrix body and polycrystalline diamond cutting elements attached to the body, rather than rolling cones. The metal-matrix material typically comprises tungsten carbide powder and a binder of a metal, such as copper. The metal-matrix material may also contain diamond grit in certain areas. Carbide elements may be attached to the body at various points to resist abrasive wear. Thermally stable polycrystalline (TSP) diamond members may also be attached to the body to resist abrasive wear, such as along the gage surface.

Hardfacing has normally not been applied to matrix body diamond bits. The high temperature for the prior art hardfacing process excessively melts the binder of the bit body metal-matrix material. Also, hardfacing has not typically been employed on diamond bit abrasive elements, such as cemented tungsten carbide inserts or tungsten carbide bricks. The high hardfacing temperature melts the binder of these members, which is typically cobalt, and also can cause the members to crack during cool down. In addition, if natural diamonds and/or diamond grit are employed in the metal-matrix of the body, the high temperatures of iron-based hardfacing causes the natural diamonds and synthetic diamonds to revert to carbon and form a carbon dioxide gas. The carbon dioxide gas creates a poor hardfacing layer. The high temperature for iron-based hardfacing has thus precluded its use as a hardfacing for a crown of a diamond bit.

Diamond bits have complex shapes and are very costly. Normally, after the bits are used in drilling, they become worn and require repair in order to be re-used. This repair might involve replacing any damaged or missing polycrystalline diamond cutting elements as well as replacing missing abrasive elements. The repair process can be time consuming and expensive.

SUMMARY

The present invention provides a method for repairing diamond earth-boring bits whereby hardfacing is applied on the gage surface of bit blades. The gage surface may contain natural diamonds, synthetic diamonds, thermally stable polycrystalline (TSP) diamonds, and/or carbide inserts. As the primary cutters on the bit blades are worn down during drilling, the gage surface of the bit blade is also worn down. A hardfacing is applied to the worn gage surfaces of the bit blade, thereby allowing the bit to drill deeper and longer without requiring replacement. Embodiments of the present invention include a method of applying hardfacing over carbide inserts set in the bit blades.

DETAILED DESCRIPTION OF THE INVENTION

Figure 1:
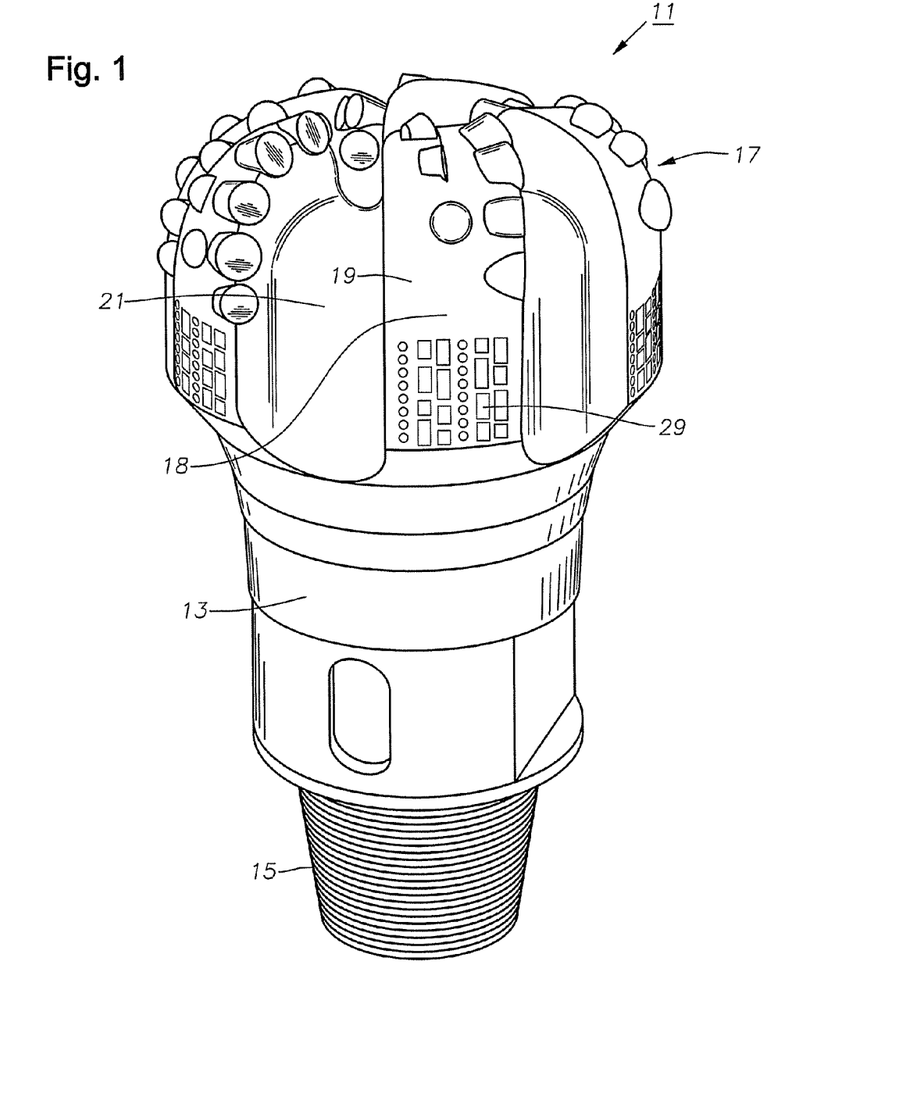
FIG. 1 is a perspective view of a diamond bit that is worn.
Figure 2:
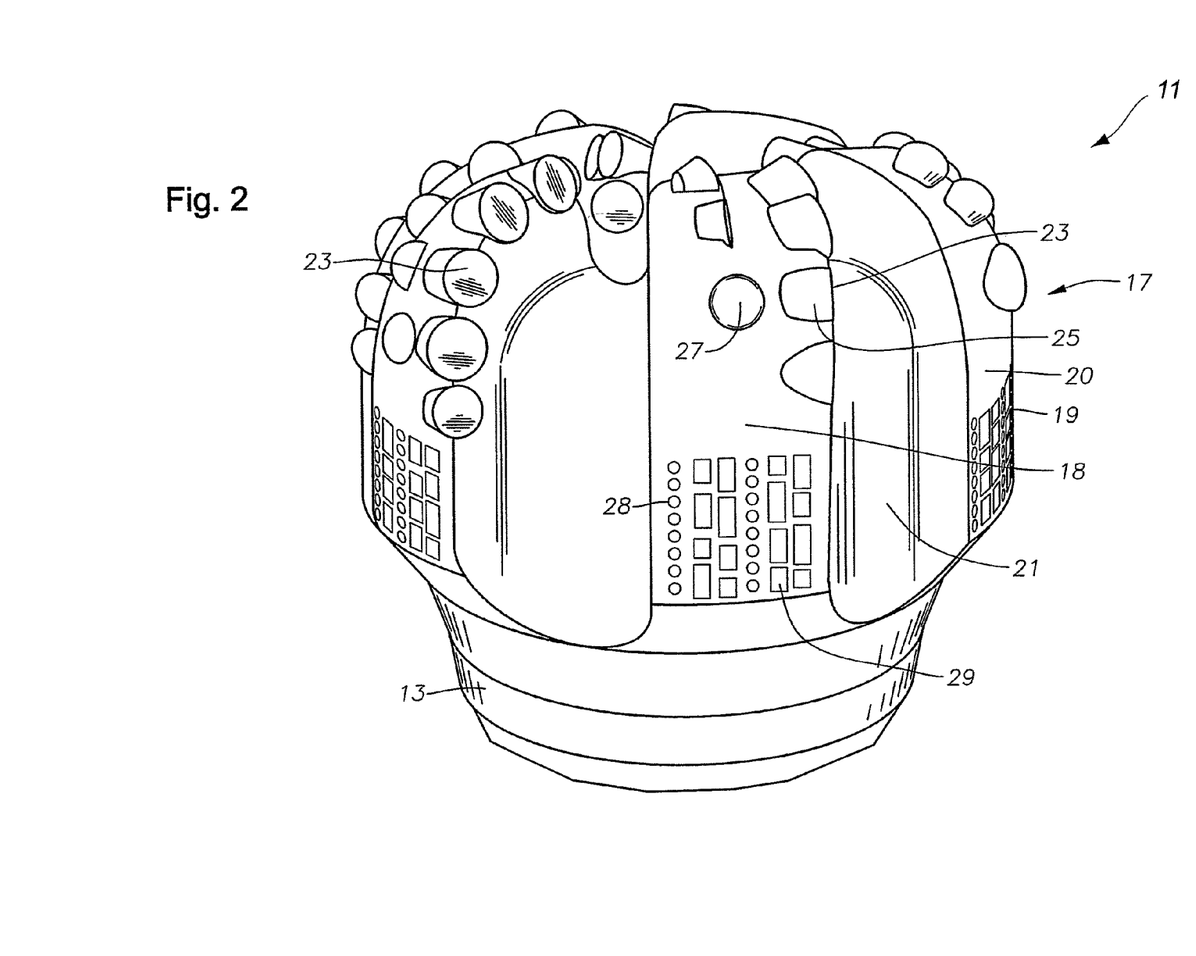
FIG. 2 is an enlarged perspective view of a portion of the diamond bit of FIG. 1.

Referring to FIGS. 1 and 2, bit 11 is an earth-boring bit having a shank 13, normally formed of steel. Shank 13 has a threaded stem 15 on its end for securing to the drill string (not shown). A crown 17 is formed on the end of shank 13 opposite stem 15. Crown 17 is typically formed of a tungsten carbide metal-matrix material 18.

Crown 17 has a plurality of blades 19 formed thereon. Blades 19 are preferably integrally formed with crown 17 and extend over and down the sides of crown 17, forming a gage surface 20. Gage surface 20 is an area located at the maximum diameter of each blade 19 and determines the diameter of the borehole being drilled. Junk slots 21 extend between each blade 19. One or more nozzles (not shown) are located on the bottom of crown 17 between blades 19 for discharging drilling fluid. The drilling fluid, along with cuttings, flows through junk slots 21 and back up the annulus surrounding the drill string.

A number of polycrystalline diamond cutters (PDCs) 23 are mounted on the leading edge of each blade 19. Some PDC elements 23 may be located on a portion of a blade 19 between the leading and trailing edges, behind those on the leading edges. In some bits, one or more of the PDC elements 23 will be located on the leading edges of part of gage surface 20 of each blade 19. Each PDC element 23 comprises a disk of polycrystalline diamond bonded to a cylindrical cemented or sintered tungsten carbide base 25 (FIG. 5), which, in turn, is brazed into a hole or receptacle 26 (FIG. 4), which was provided in metal-matrix material 18 of blade 19 while crown 17 was being molded.

Bit 11 has a number of wear-resistant members mounted on it to resist wear of crown 17. These wear-resistant members are harder and more resistant to abrasive wear than the metal-matrix material 18 of crown 17. For example, the particular bit 11 shown has an optional cemented or sintered tungsten carbide insert 27 mounted to each blade 19 for resisting wear. Insert 27 is dome-shaped and is located approximately midway between the leading and trailing edges of each blade 19 above gage surface 20. In this example, insert 27 is located directly rearward from one of the PDC elements 23 mounted at the leading edge of blade 19.

In this embodiment, as shown in FIG. 2, other wear-resistant members include natural diamonds 28 mounted on each gage surface 20. Natural diamonds 28 are normally sufficiently large to be easily visible without magnification. Two vertical rows of natural diamonds 28 are shown on each gage surface 20, but this arrangement can vary. The exposed faces of natural diamonds 28 are generally flush with the surface of metal-matrix material 18.

Figure 7:
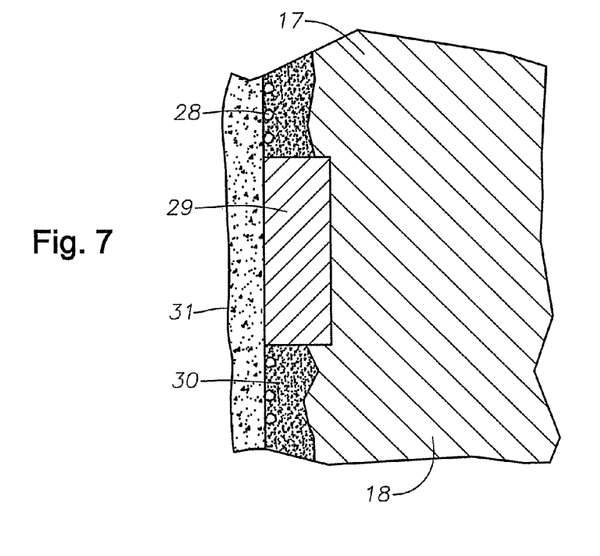
FIG. 7 is a schematic sectional view of a portion of one of the gage areas of the diamond bit of FIG. 1.

Other abrasion-resistant members include carbide members 29, typically called "bricks," which are mounted on gage surface 20 of each blade 19 alongside the rows of natural diamonds 28. Carbide bricks 29 are of cemented or sintered tungsten carbide, similar to the material used for carbide base 25 and tungsten carbide insert 27, but are typically rectangular in shape. The exposed face of each brick 29 is generally flush with the surface of metal-matrix material 18 of gage surface 20. FIG. 7 illustrates one of the carbide bricks 29 embedded within metal-matrix material 18 of crown 17.

Also, FIG. 7 shows that metal-matrix material 18 in this example also contains diamond grit particles 30, which are exaggerated in size. Diamond grit particles 30 comprise much smaller diamonds than natural diamonds 28 and are not readily visible without magnification. The individual particles of diamond grit 30 may be coated, and are embedded within metal-matrix material 18 at or near the surface.

Figure 8:
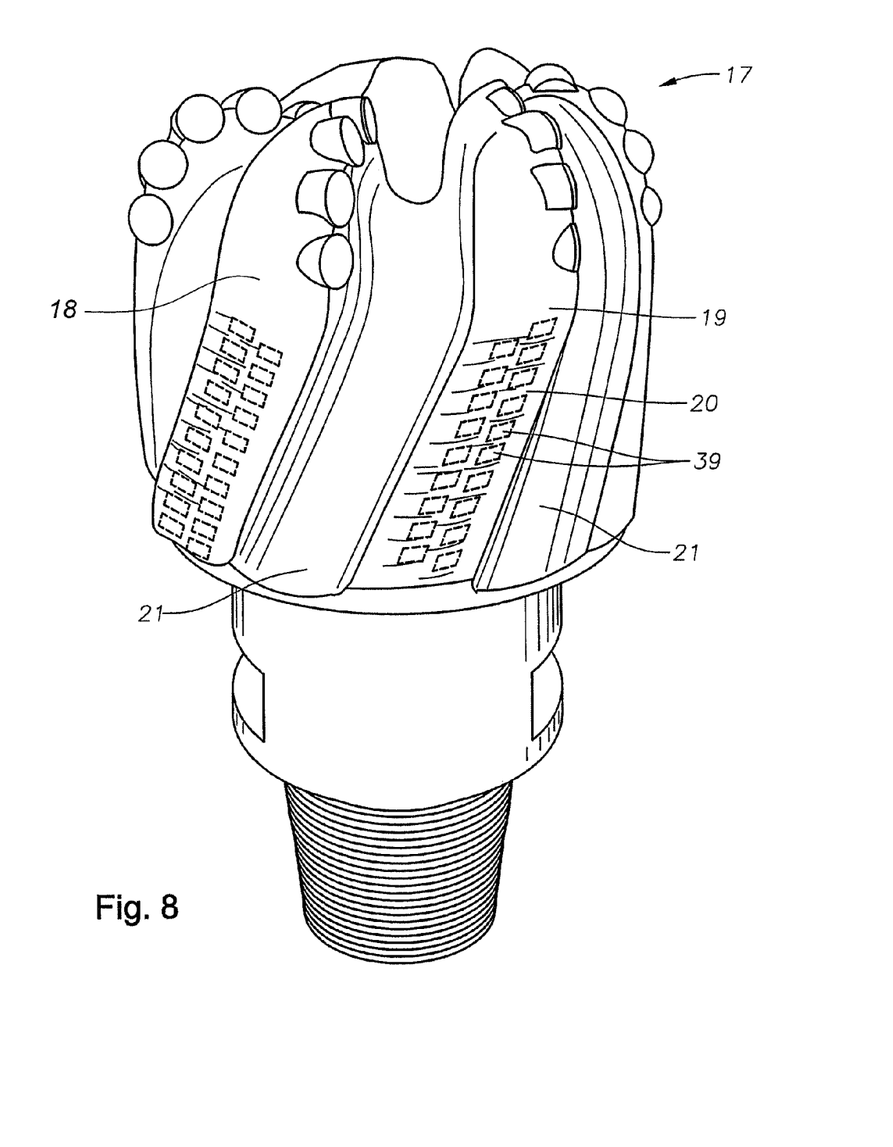
FIG. 8 is a perspective view of a diamond bit that is worn.
Figure 9:
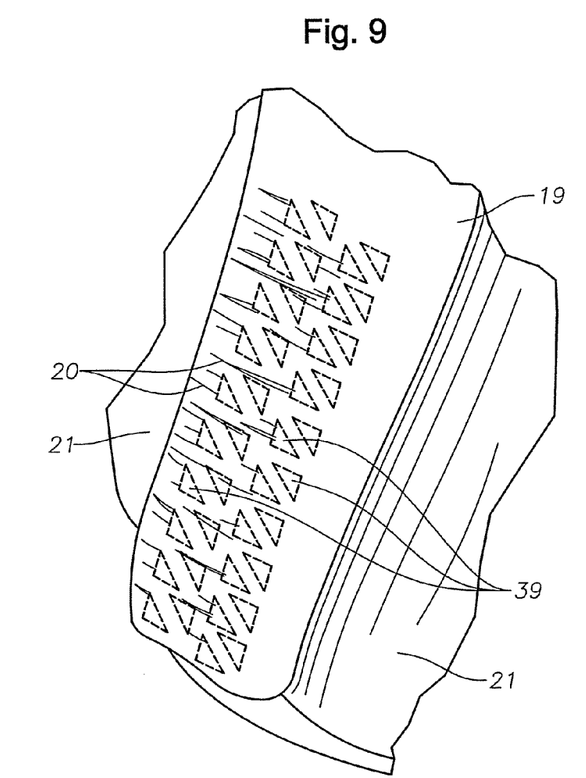
FIG. 9 is an enlarged perspective view of a portion of the diamond bit of FIG. 8.

In a different embodiment of bit 11, as shown in FIGS. 8 and 9, thermally stable polycrystalline (TSP) diamonds 39 are mounted on each gage surface 20 to resist wear of gage surface 20. TSP diamonds 39 are typically larger than natural diamonds 28 (FIG. 2) and are easily visible without magnification. Four offset vertical rows of TSP diamonds 39 are shown on each gage surface 20, but this arrangement can vary. The exposed faces of TSP diamonds 39 are generally flush with the surface of metal-matrix material 18.

Figure 4:
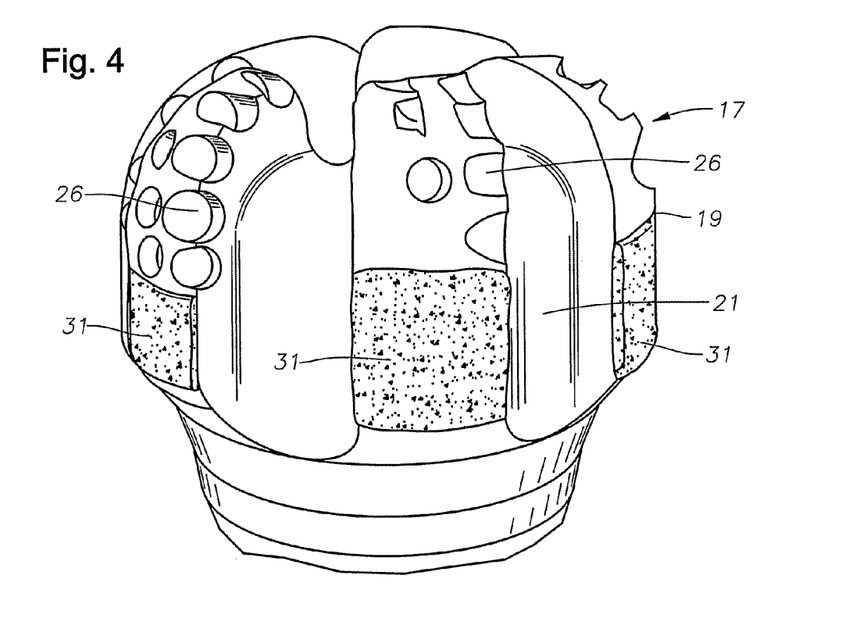
FIG. 4 is a perspective view of the diamond bit of FIG. 1, after some repairs have been done to the bit by hardfacing but before grinding.

Normally, crown 17 is formed in an infiltration process, which is a long cycle, high temperature, atmospheric pressure process. A graphite mold is formed in the shape of crown 17. Shank 13 is supported by a fixture, and blanks are placed in the mold to define PDC element receptacles 26 (FIG. 4). Tungsten carbide bricks 29, natural diamonds 28, TSP diamonds 39, and tungsten carbide inserts 27, if employed, are fixed at appropriate places in the mold. A matrix powder, typically tungsten carbide, is placed in the mold and around shank 13. The powder may also contain diamond grit 30 in certain places. Binder particles, such as a copper alloy, are placed on an upper surface of the tungsten carbide powder within the graphite mold. The heat melts the binder, causing it to infiltrate down through the tungsten carbide powder, bonding the carbide powder, diamond grit 30, natural diamonds 28, TSP diamonds 39, carbide bricks 29 and tungsten carbide inserts 27. After removal from the furnace, the PDC elements 23 are subsequently brazed into receptacles 26.

As shown in FIGS. 1 and 2, after drilling a number of wells, some of the PDC elements 23 may be broken. In addition, some of the carbide bricks 29 may be cracked and broken. Tungsten carbide inserts 27 may be worn or broken. The leading and trailing edges of blades 19 may also become eroded. If the metal-matrix material 18 erodes too deeply, the carbide bases 25 cannot be reinstalled within receptacles 26 (FIG. 4) and the bit 11 will have to be discarded. As shown in FIGS. 8 and 9, after drilling a number of wells, the TSP gage surface 20 may be worn. If gage surface 20 continues to wear, further exposing TSP diamonds 39, the bit 11 will eventually be discarded.

In the method comprised by this invention, hardfacing is employed on several areas of a bit that normally would not be feasible. The hardfacing is preferably a nickel or nickel alloy-based hardfacing. The nickel-based hardfacing melts at a much lower temperature than iron-based hardfacing, such as at a temperature less than 1200° C. This lower temperature is not as detrimental to metal-matrix material 18, natural diamonds 28, diamond grit 30, TSP diamonds 39, tungsten carbide bricks 29, and tungsten carbide inserts 27. The lower temperature does not excessively melt the binder from metal-matrix material 18 nor the binder from sintered tungsten carbide bricks 29 and inserts 27.

One example of a type of suitable alloy is an alloy of nickel, boron, chromium and silicon in the following relative percentages by weight:

| | |
|---|---|
| carbon | .45% |
| chromium | 11.0% |
| silicon | 2.25% |
| boron | 2.5% |
| iron | 2.25% |
| nickel | balance |

This alloy has a hardness of about 38-42 Rockwell C and a melting temperature of about 1100° C. The hard abrasive components may be the same as conventionally used on rolling cone bits with iron-based hardfacing. For example, the hardfacing may include monocrystalline tungsten carbide, sintered tungsten carbide, either crushed or spherical, and cast tungsten carbide, either crushed or spherical. The sizes of the particles and the quantity by weight of the particles to the binder may be the same as conventionally used in iron-based hardfacing, but are in no way limited to these parameters. Preferably, a rod is formed containing the nickel alloy mixed with the hard abrasive particles. The rod may be formed in different manners. One way is by liquid phase sintering of the nickel alloy and abrasive particles. Another way is by an extrusion process of the nickel alloy mixed with the abrasive particles, which results in the extruded product being rolled onto a spool. Alternatively, the nickel alloy could be made into a tube and the abrasive particles placed inside.

To repair bit 11, normally a technician removes PDC elements 23 from their receptacles 26 before applying hardfacing so as to avoid the heat from damaging PDC elements 23. They are removed conventionally by applying brazing temperature heat to soften the brazing metal. Once elements 23 are removed, the operator then uses an oxy-acetylene torch to apply the nickel-based hardfacing.

Figure 3:
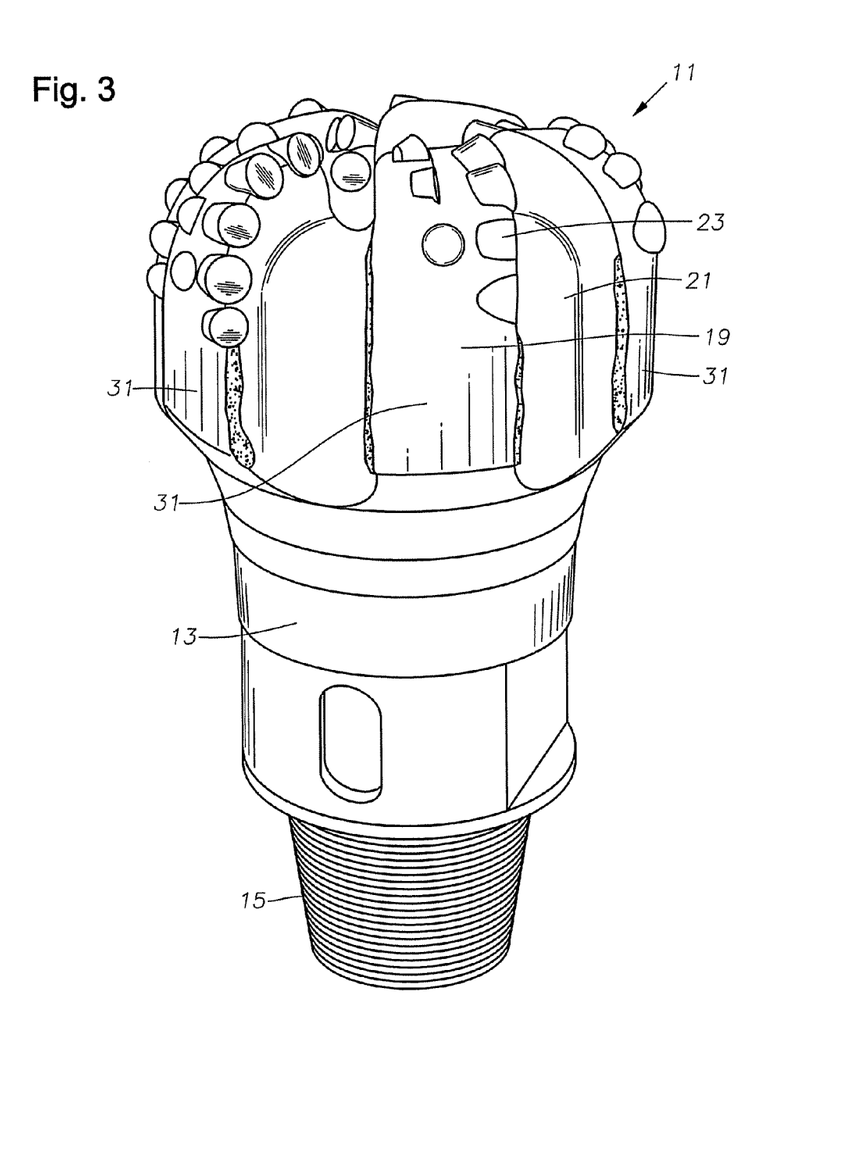
FIG. 3 is a perspective view of the diamond bit of FIG. 1 after repair to a gage area of the bit by hardfacing and grinding the hardfacing to the gage diameter.
Figure 5:
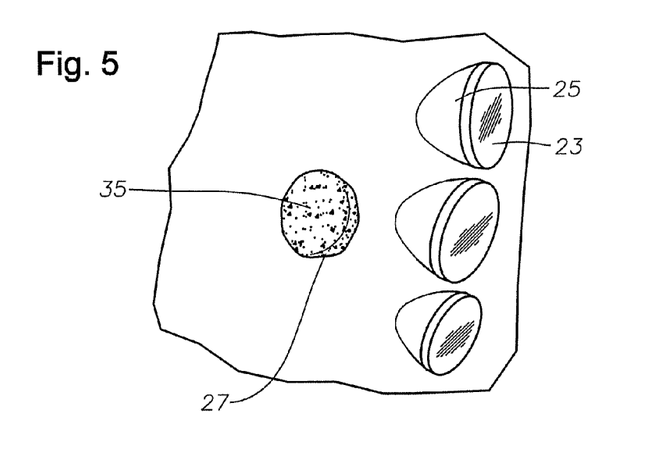
FIG. 5 is an enlarged perspective view of a portion of the diamond bit of FIG. 1 illustrating a tungsten carbide insert on the bit that has been repaired by hardfacing.
Figure 6:
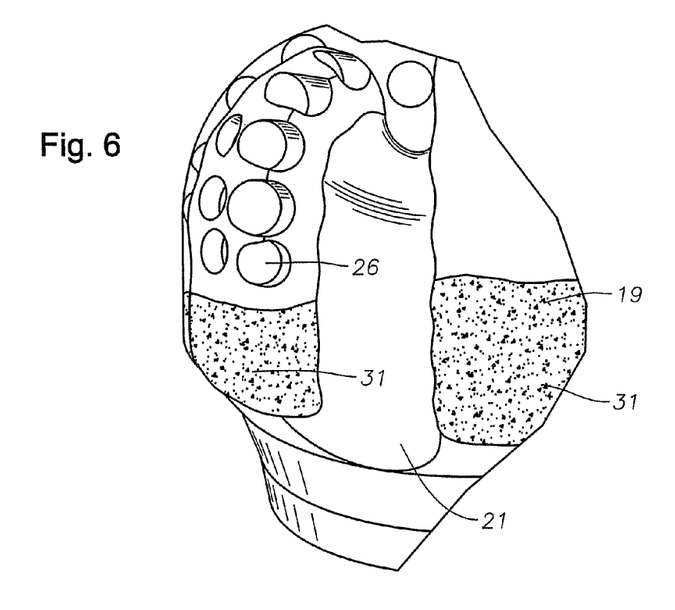
FIG. 6 is a perspective view of another portion of the diamond bit of FIG. 1, showing hardfacing applied to the blade for repair but before grinding.
Figure 10:
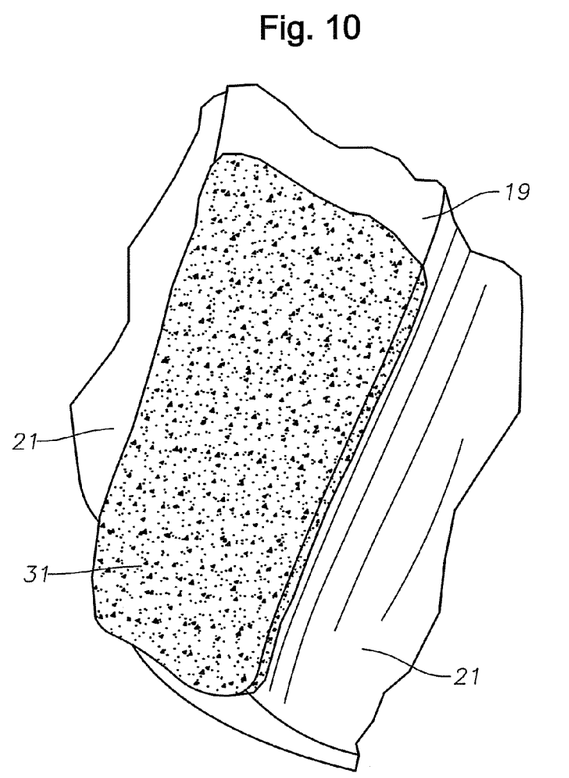
FIG. 10 is a perspective view of the diamond bit of FIG. 8 after repair to the gage area of the bit by hardfacing and grinding the hardfacing to the gage diameter.
Figure 11:
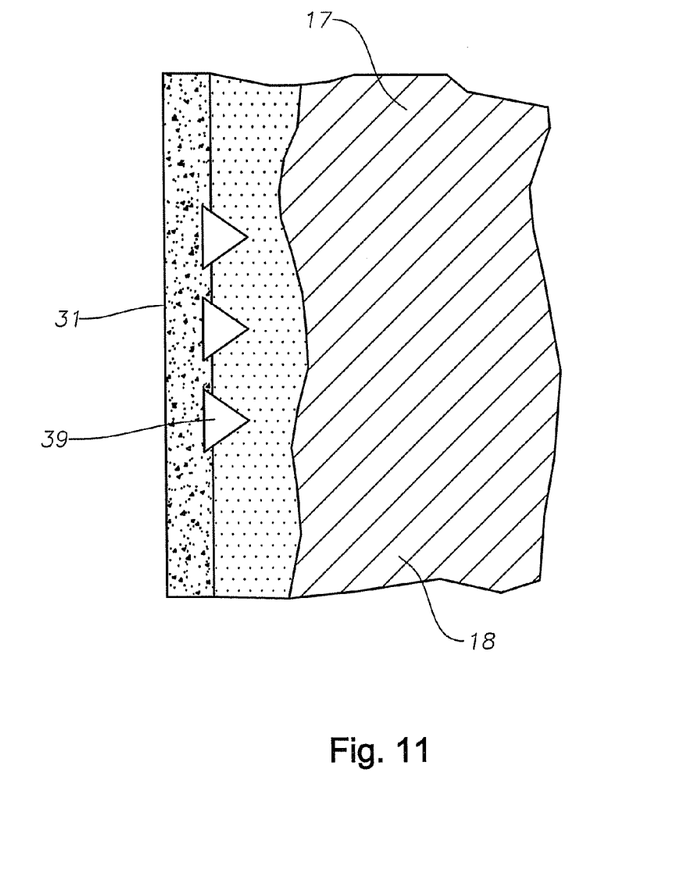
FIG. 11 is a schematic sectional view of a portion of one of the gage areas of the diamond bit of FIG. 8.

The technician will apply hardfacing to the worn gage surface 20, as illustrated in FIGS. 4 and 10 and indicated by the numeral 31. Gage hardfacing layer 31 may be applied completely over the cracked and broken carbide bricks 29 (FIG. 3). As shown in FIGS. 7 and 11, gage hardfacing layer 31 overlies carbide bricks 29, metal-matrix material 18, natural diamonds 28, TSP diamonds 39, and exposed diamond grit 30. Gage hardfacing layer 31 may extend from the leading edge to the trailing edge of each blade 19 and may extend up to the closest PDC element 23 on each blade 19 (not shown). FIG. 5 shows hardfacing layer 35 applied to the exposed portions of tungsten carbide insert 27 (FIG. 2).

After applying the hardfacing, the technician grinds gage surface hardfacing layer 31 to the original gage tolerances (FIG. 3) and grinds the other hardfacing layers where needed. The operator then brazes PDC elements 23 into receptacles 26 (FIG. 4). Tests indicate that the nickel-based hardfacing adheres well to metal-matrix material 18 and is wear resistant.

The invention claimed is:

1. A method for repairing an earth-boring drill bit having a body formed of a matrix material, the body having a plurality of blades having polycrystalline diamond compact (PDC) cutting elements bonded to the plurality of blades at least partially within receptacles of the plurality of blades, each blade of the plurality of blades having a gage surface, the earth-boring drill bit further comprising at least one wear-resistant member bonded into the matrix material of the body to resist abrasive wear on the body, the method comprising:
    after use of the earth-boring drill bit and damage or wear to the PDC cutting elements and the at least one wear-resistant member, removing at least some of the PDC cutting elements from at least some of the receptacles in the plurality of blades of the body and subsequently applying a layer of hardfacing alloy over the matrix material of the plurality of blades and over and around the at least one wear-resistant member and substantially covering the entire gage surface of each blade of the plurality of blades, at a temperature less than 1200°C.;
    grinding the layer of hardfacing alloy on each gage surface to provide the earth-boring drill bit with a restored diameter defined by the gage surfaces of the plurality of blades, the restored bit diameter being at least substantially equal to an original bit diameter defined by the gage surfaces of the plurality of blades prior to the use of the earth-boring drill bit; and
    bonding new PDC cutting elements to the body at least partially within the at least some of the receptacles after applying the layer of hardfacing alloy.

2. The method of claim 1, further comprising selecting the layer of hardfacing alloy to comprise a nickel-based alloy.

3. The method of claim 1, wherein applying the layer of hardfacing alloy comprises applying the layer of hardfacing alloy with an oxy-acetylene torch.

4. A method for repairing a drill bit having a body formed of a carbide matrix material, the body having a plurality of blades having worn polycrystalline diamond compact (PDC) cutters mounted thereon, and the body having worn wear-resistant members bonded into the matrix material of the body at gage surfaces of the body to resist abrasive wear, the worn wear-resistant members being selected from the group consisting of carbides, natural diamonds, synthetic diamonds, and thermally stable polycrystalline diamonds, the method comprising:
    removing worn PDC cutters from at least one blade of the plurality of blades of the body;
    after removing the worn PDC cutters, applying a hardfacing layer over at least part of the worn wear-resistant members and substantially covering the entire gage surface of each blade of the drill bit at a temperature less than 1200°C.;
    mounting new PDC cutters on the at least one blade after applying the hardfacing layer; and
    grinding the hardfacing layer on each gage surface of each blade to provide the drill bit with a restored diameter defined by the gage surfaces of the blades, the restored bit diameter being at least substantially equal to an original bit diameter defined by the gage surfaces of the blades prior to the use of the drill bit.

5. The method of claim 4, further comprising selecting the hardfacing layer to comprise a nickel-based alloy.

6. The method of claim 4, wherein applying the hardfacing layer comprises applying the hardfacing layer with an oxy-acetylene torch.

\* \* \* \* \*